United States Patent
Thorwarth

(10) Patent No.: US 11,543,350 B2
(45) Date of Patent: Jan. 3, 2023

(54) CALIBRATION TARGET

(71) Applicant: IMT Masken und Teilungen AG, Greifensee (CH)

(72) Inventor: Goetz Thorwarth, Lindau (CH)

(73) Assignee: IMT MASKEN UND TEILUNGEN AG, Greifensee (CH)

( * ) Notice: Subject to any disclaimer, the term of this patent is extended or adjusted under 35 U.S.C. 154(b) by 0 days.

(21) Appl. No.: 17/336,340

(22) Filed: Jun. 2, 2021

(65) Prior Publication Data

US 2021/0396672 A1    Dec. 23, 2021

(30) Foreign Application Priority Data

Jun. 18, 2020  (EP) .................................. 20180863

(51) Int. Cl.
*G01N 21/64*    (2006.01)

(52) U.S. Cl.
CPC ..... *G01N 21/6402* (2013.01); *G01N 21/6428* (2013.01); *G01N 2021/6439* (2013.01); *G01N 2201/06113* (2013.01); *G01N 2201/127* (2013.01)

(58) Field of Classification Search
CPC ........... G01N 21/6402; G01N 21/6428; G01N 2021/6439; G01N 2201/06113; G01N 2201/127; G01N 21/645; G01N 21/278; C09K 11/02; C09K 11/65

See application file for complete search history.

(56) References Cited

U.S. PATENT DOCUMENTS

| | | | |
|---|---|---|---|
| 2007/0190566 A1 | 8/2007 | Montagu | |
| 2008/0038835 A1* | 2/2008 | Westphal | G01N 21/278 436/172 |
| 2010/0323178 A1 | 12/2010 | Ruoff et al. | |
| 2012/0224050 A1* | 9/2012 | Staker | G01N 21/6452 348/95 |
| 2013/0126757 A1 | 5/2013 | Sywe et al. | |
| 2017/0153235 A1* | 6/2017 | Kim | G01N 33/5308 |
| 2019/0322930 A1* | 10/2019 | Dalis | C09K 11/65 |

FOREIGN PATENT DOCUMENTS

| | | |
|---|---|---|
| DE | 20104446 U1 | 6/2001 |
| WO | WO 2017084998 A1 | 5/2017 |

OTHER PUBLICATIONS

Jingzhi Shang, et al., "The Origin of Fluorescence from Graphene Oxide," Scientific Reports, Nov. 9, 2012, pp. 1-8, Springer Nature, Basingstoke, United Kingdom.

* cited by examiner

*Primary Examiner* — Kiho Kim

(74) *Attorney, Agent, or Firm* — Leydig, Voit & Mayer, Ltd.

(57) ABSTRACT

A calibration target for calibrating an optoelectronic device for analyzing biomolecules by detecting fluorescence signals from a sample includes a substrate and a solid fluorescent layer that is disposed on the substrate and capable of being excited by laser light. The fluorescent layer has an optically inactive matrix having embedded therein a carbon-based component that is excitable to light emission.

11 Claims, 2 Drawing Sheets

CALIBRATION TARGET

CROSS-REFERENCE TO PRIOR APPLICATION

Priority is claimed to European Patent Application No. EP 20180863.1, filed on Jun. 18, 2020, the entire disclosure of which is hereby incorporated by reference herein.

FIELD

The present invention relates to a calibration target for calibrating an optoelectronic device for analyzing biomolecules by detecting fluorescence signals from a sample.

BACKGROUND

Systems for analyzing biomolecules by detecting fluorescence signals from a sample are an important tool in the field of medical diagnostics or also in biotechnology. Such systems contain optical detectors that detect light emitted by a sample. A typical application of such systems is gene sequencing.

This is done, for example, by labeling the four DNA bases adenine (A), cytosine (C), guanine (G), and thymine (T) with fluorescent dyes that are specific to the respective bases. When the sample treated in this way is excited by laser light, these dyes emit different wavelengths, which can be associated with the respective bases. If the intensity of this emission is detected and resolved by location and the respective wavelength, it is possible to make statements even about the exact structure of a DNA.

For this purpose, however, it is crucially important to calibrate the optical detectors; i.e., to apply light with a known frequency and intensity thereto so as to be able to adjust the detector signal to a reference level. Such calibration may be necessary from time to time, during servicing, or even each time before the system is used in order to obtain results with the required accuracy.

Calibration is typically performed using a calibration target instead of a sample. The calibration target is either permanently installed in the respective system or inserted into the system for calibration purposes.

Frequently, the calibration target used is a module such as is also used for the actual measuring process in the respective system. These modules have channels and reservoirs through which the samples to be analyzed are pumped. When these channels and reservoirs are filled with a known mixture of the dyes that are also used for the measurement, then excitation of the dyes by laser light having one or more excitation wavelengths produces defined signals of different fluorescence wavelengths in the detectors.

A disadvantage of these calibration targets is the short lifetime of the dyes. The dyes may bleach or otherwise degenerate when irradiated by laser light, and may therefore emit less light intensity after some time. They are then useless for calibration purposes. A known countermeasure is to provide for replacement of the aged dyes through constant movement of the dye mixture within the channels (for example by Brownian motion or by pumping). However, this method of obtaining a stable calibration target is relatively complex and time-consuming.

WO 2017084998 A1 describes a calibration target which is based on a fluorescent, nanocrystalline solid in order to avoid degradation of the dyes. In this context, metal sulfides are mentioned as suitable solids. However, due to the relatively narrow-band emission of these nanocrystals, four different materials are required to cover the wavelengths to be calibrated. In addition, such nanoparticles often have a relatively large Stokes shift, so that detectors which need to be sensitive near the excitation wavelength cannot be calibrated.

SUMMARY

In an embodiment, the present invention provides a calibration target for calibrating an optoelectronic device for analyzing biomolecules by detecting fluorescence signals from a sample. The calibration target includes a substrate and a solid fluorescent layer that is disposed on the substrate and capable of being excited by laser light. The fluorescent layer has an optically inactive matrix having embedded therein a carbon-based component that is excitable to light emission

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

In an embodiment, the present invention provides an improved calibration target.

In an embodiment, the present invention provides a calibration target for calibrating an optoelectronic device for analyzing biomolecules by detecting fluorescence signals from a sample, the calibration target having a solid fluorescent layer that is disposed on a substrate and capable of being excited by laser light. The fluorescent layer includes an optically inactive matrix having a carbon-based component that is excitable to light emission.

It has been found that a calibration target constructed in this way is stable over a particularly long period of time, even when excited to light emission by high laser powers. Such a calibration target can be permanently installed in a system and used for calibration as needed.

As for the transparent matrix and the component that can be excited to light emission, it is possible to find materials that provide for efficient coupling-in of the excitation light and for broadband fluorescence, making it possible to calibrate detectors for several different wavelengths.

Further advantages and features of the present invention will be apparent from the following description of various embodiments, taken in conjunction with the figures. Although the invention is described and illustrated using the example of gene sequencing, the inventive calibration target is also suitable for other types of optoelectronic devices for analyzing biomolecules by detecting fluorescence signals from a sample, such as automated fluorescence measurement microscopes which allow analysis of the viral distribution in tissue, metabolic processes or protein interactions.

DETAILED DESCRIPTION

Figure 1:
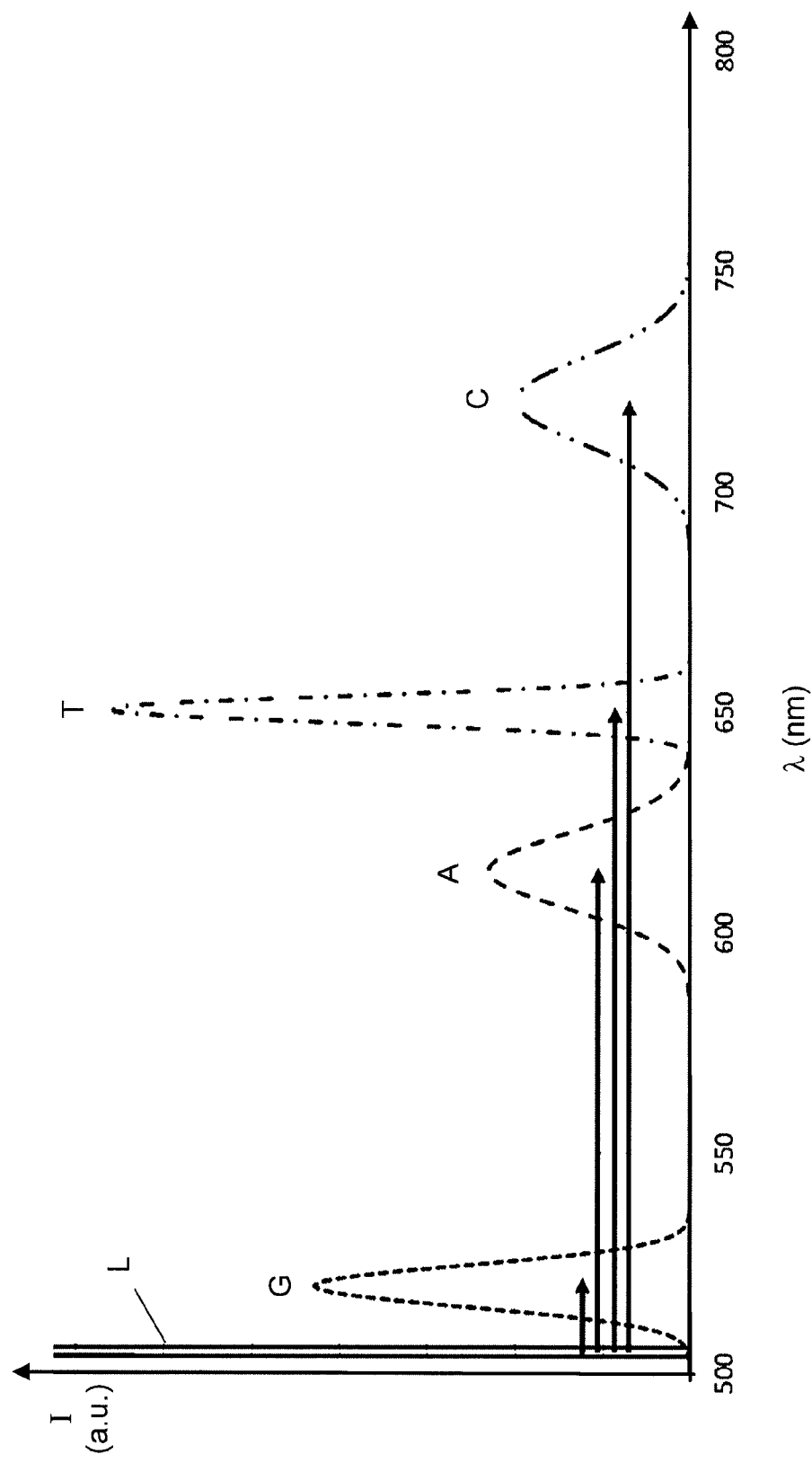
FIG. 1 shows an emission spectrum from gene sequencing.

FIG. 1 schematically shows an emission spectrum such as may occur in DNA sequencing. The intensity I of the light is plotted in any desired units against the wavelength λ of the light.

When the sample to be analyzed is excited by laser light L having a wavelength of about 510 nm, then the dyes used to label the four bases in the DNA emit light of different wavelengths. This fluorescence-based light emission occurs at different wavelengths which are specific to the respective bases. The four emission peaks are therefore labeled with the names of the respective bases; i.e., with G, A, T and C. Detection of these G, A, T and C peaks is accomplished using, for example, photodetectors having corresponding color filters.

These detectors are calibrated using a calibration target, which is inserted into the gene sequencing system instead of a sample holder.

Figure 2:
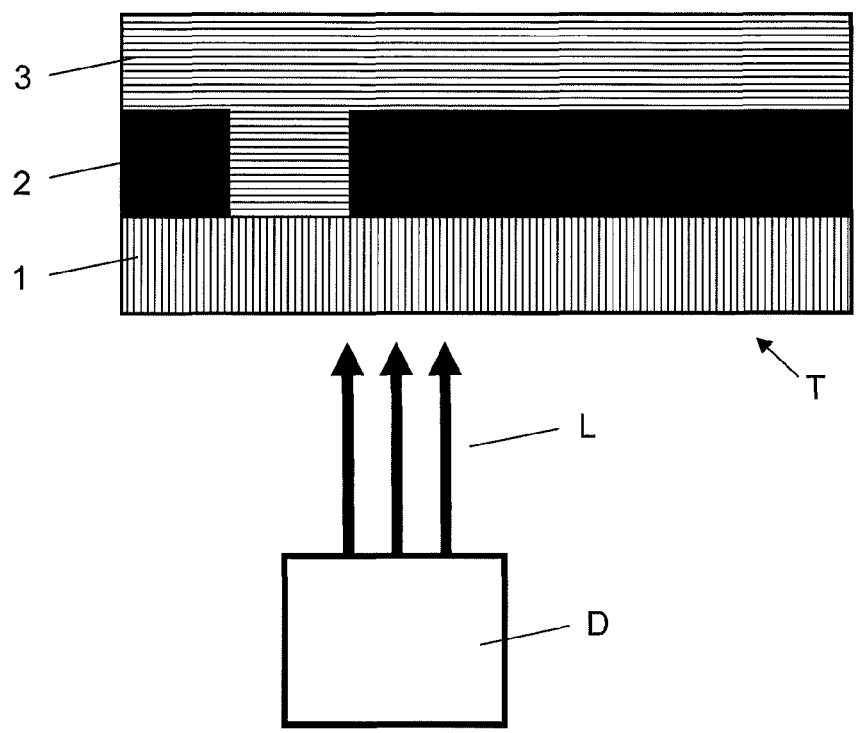
FIG. 2 depicts a first exemplary embodiment of the calibration target.

Such a calibration target T is shown FIG. 2. An opaque layer 2 of chromium is disposed on a transparent substrate 1 of glass. The opaque layer is interrupted in some locations. Other opaque materials, such as aluminum, tantalum, molybdenum or tungsten, may also be used instead of chromium. As a result, a reference pattern (e.g., points, lines, crosses, etc.) is produced which can be used in a detector D to evaluate the position of calibration target T or also to focus the optics, for example by analyzing the edges of the reference pattern.

Calibration target T also has a fluorescent layer 3 which is deposited on chromium layer 2 so that the openings of chromium layer 2 are also filled with the fluorescent material.

An optoelectronic analysis unit contains a source of laser light L and one or more photodetectors D for detecting the light emitted by fluorescent layer 3.

Figure 3:
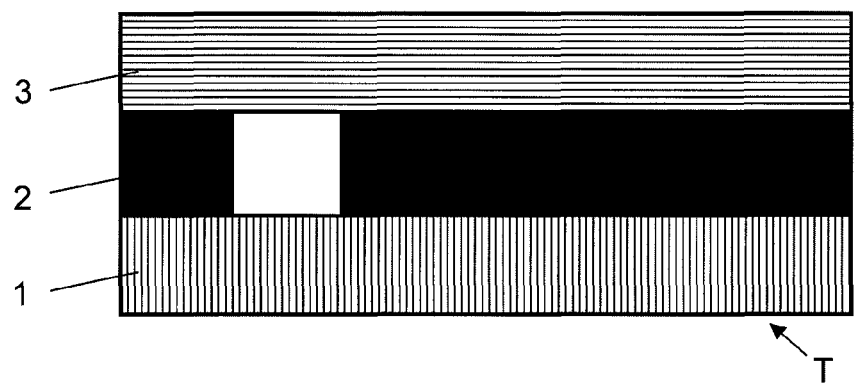
FIG. 3 illustrates a second exemplary embodiment of the calibration target.

The second exemplary embodiment of a calibration target T, shown in FIG. 3, is a slight modification of the first exemplary embodiment. Here, fluorescent layer 3 is deposited in such a way that the openings in chromium layer 2 are not filled with fluorescent material. Excitation light L nevertheless reaches fluorescent layer 3.

Figure 4:
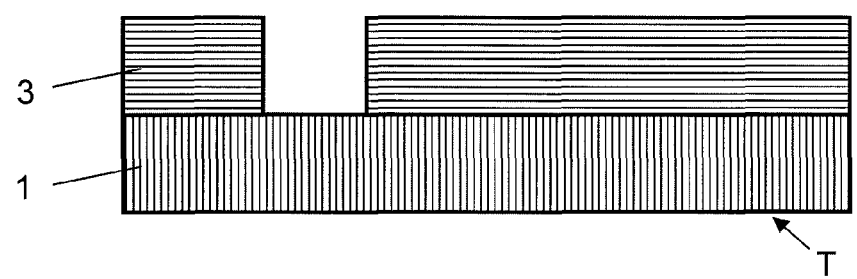
FIG. 4 shows a third exemplary embodiment of the calibration target.

In accordance with the third exemplary embodiment shown in FIG. 4, the opaque chromium layer 3 can also be omitted if fluorescent layer 3 itself is patterned so that light and dark regions can be analyzed as a reference pattern in detector D.

In all three exemplary embodiments, a fluorescent layer 3 is used which emits a broadband fluorescent light when excited by laser light L, so that all wavelengths to be detected in detector D are covered. This makes it possible to calibrate the spectral sensitivities of these detectors D.

Fluorescent layer 3 is preferably inorganic in order to avoid degeneration caused by excitation with high laser power. For example, $TiO_2$, $SiO_2$ or $Ta_2O_5$ may be used as a transparent, non-luminescent matrix with embedded graphene oxide. Graphene oxide is an inorganic, luminescent or fluorescent material.

To maximize the interaction of the irradiated laser light L with the fluorescent medium in the matrix, the matrix is preferably selected to be of a material having a high refractive index (of about $n>2$) and a colloidal structure, such as $TiO_2$ or $Ta_2O_5$, which was obtained using a sol-gel process. However, a matrix having a refractive index of about 1.4 (e.g., $SiO_2$) may be sufficient.

Similar to organic dyes, the fluorescent material should have a low Stokes shift and an as broadband as possible emission in order to cover all detection channels. Furthermore, it must exhibit fluorescence at relatively long wavelengths, e.g., 532 nm. Graphene oxide meets all these requirements particularly well. More generally, however, other carbon-based materials such as graphene, reduced graphene oxide, graphite, diamond-like carbon (DLC), or thermally, chemically or radiation-degraded polymer, here in particular electron beam resist or photoresist are also suitable.

A useful composition of fluorescent layer 3 is based on a proportion of the fluorescent material in the entire layer 3 of from 1 to 50 percent by weight, preferably 5 to 20 percent by weight.

The thickness of glass substrate 1 (another transparent substrate may be used instead of glass) is typically in the range of 0.05 mm to 4 mm. The opaque chromium layer 2 is typically in the range of 20 nm to 1000 nm, and fluorescent layer 3 is in the range of 500 nm to 20000 nm.

The respective layers can be readily produced using known manufacturing methods, such as by spin coating, dip coating, or spray coating of a solution; PVD processes such as magnetron co-sputtering, arc evaporation, high-power impulse magnetron sputtering, thermal or electron beam evaporation, or also PECVD.

In the embodiments described in the foregoing, a transparent substrate 1 was used to allow laser light L to be passed through substrate 1 and onto fluorescence layer 3. Alternately, an opaque substrate may also be used. In this case, laser light L must be irradiated from the side opposite the substrate. A reference pattern made of patterned chromium must then be disposed between fluorescent layer 3 and the laser light source.

Several manufacturing processes for such calibration targets T are given below by way of example:

Spin-coating process: 20 ml of toluene are mixed with 5% by weight of PMMA and stirred at 45° C. for 5 hours. 1 ml of titanium tetraisopropoxide (TTIP) is added drop by drop. 5 ml of the resulting solution are spun at 1500 rpm for 30 sec onto a glass wafer which was previously coated with a patterned chromium layer by reactive ion etching (RIE). The coated wafer is annealed at 300° C. for 5 hours to produce fluorescent carbon structures. The calibration targets T are then cut out by laser cutting.

Spin-coating process: 20 ml of toluene are mixed drop by drop, while stirring, with 1 ml of titanium tetraisopropoxide (TTIP). 5 ml of alkylamine-functionalized graphene oxide in toluene (e.g., Sigma Aldrich product no. 809055-50ML) are mixed with the solution while stirring. 4 ml of the resulting solution are spun at 1000 rpm for 30 sec onto a glass wafer (D263 bio) which was previously coated with a patterned chromium layer by a lift-off process. The coated wafer is annealed at 250° C. for 5 hours to crystallize the matrix. The calibration targets T are then cut apart by a dicing saw.

PVD process: An 8" quartz wafer is coated with a patterned chromium layer by sputter deposition, lithography, and RIE. The wafer is introduced into a PVD system having two magnetron sputtering targets and is provided with a 10 percent-by-weight graphite/Ta2O5 coating having a thickness of 200 nm by co-sputtering of Ta2O5 and graphite. After removal, the wafer is diced by perforating it using a laser and breaking it apart.

PACVD process: An 8" glass wafer is coated with a patterned titanium layer by e-beam evaporation and lithography. The wafer is introduced into a PACVD system and provided with a 20-percent $C/TiO_2$ coating by RF plasma discharge in argon, octadiene, and TTIP. Subsequently, the wafer is annealed in an oven at 320° C. for 3 hours to crystallize the matrix. After removal, the wafer is diced by laser cutting.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A calibration target for calibrating an optoelectronic device for analyzing biomolecules by detecting fluorescence signals from a sample, the calibration target comprising:
    a substrate; and
    a solid fluorescent layer that is disposed on the substrate and capable of being excited by laser light,
    wherein the fluorescent layer has an optically inactive matrix having embedded therein a carbon-based component that is excitable to light emission,
    wherein the optically inactive matrix includes a material having a refractive index greater than 1.4,
    wherein the optically inactive matrix has a colloidal structure,
    wherein the optically inactive matrix includes titanium dioxide, silicon dioxide, or tantalum pentoxide, and
    wherein the carbon-based component is selected from graphene, graphene oxide, reduced graphene oxide, graphite, diamond-like carbon, or a thermally, chemically or radiation-degraded polymer.

2. The calibration target as recited in claim 1, wherein the optically inactive matrix includes a material having a refractive index greater than 2.

3. The calibration target as recited in claim 1, wherein the optically inactive matrix is produced by a sol-gel process.

4. The calibration target as recited in claim 1, wherein the carbon-based component includes an electron beam resist or a photoresist.

5. The calibration target as recited in claim 1, wherein the substrate is a glass substrate.

6. The calibration target as recited in claim 1, wherein the fluorescent layer is completely composed of inorganic components.

7. The calibration target as recited in claim 1, further comprising a patterned, opaque layer that partially shields the fluorescent layer from the laser light so as to form a reference pattern.

8. The calibration target as recited in claim 7, wherein the opaque layer is made of chromium.

9. The calibration target as recited in claim 1, wherein the fluorescence layer is patterned to form a reference pattern.

10. The calibration target as recited in claim 1, wherein the carbon-based component that is excitable to light emission is present in the fluorescent layer in a proportion of between 1 and 50 percent by weight.

11. The calibration target as recited in claim 10, wherein the carbon-based component that is excitable to light emission is present in the fluorescent layer in a proportion of between 5 and 20 percent by weight.

* * * * *